(12) United States Patent
Taaghol et al.

(10) Patent No.: US 8,355,378 B2
(45) Date of Patent: Jan. 15, 2013

(54) HIERARCHICAL CELL DEPLOYMENT

(75) Inventors: Pouya Taaghol, San Jose, CA (US); Muthaiah Venkatachalam, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1077 days.

(21) Appl. No.: 12/043,343

(22) Filed: Mar. 6, 2008

(65) Prior Publication Data
US 2008/0219216 A1    Sep. 11, 2008

Related U.S. Application Data

(60) Provisional application No. 60/894,146, filed on Mar. 9, 2007.

(51) Int. Cl.
*H04Q 7/00* (2006.01)

(52) U.S. Cl. ......... 370/331; 455/436; 455/441; 455/444

(58) Field of Classification Search .................. 370/331
See application file for complete search history.

(56) References Cited

U.S. PATENT DOCUMENTS

| | | | |
|---|---|---|---|
| 5,280,471 A | 1/1994 | Kondou et al. |
| 5,551,064 A | 8/1996 | Nobbe et al. |
| 5,561,841 A | 10/1996 | Markus |
| 5,568,654 A | 10/1996 | Fukawa |
| 5,787,344 A | 7/1998 | Scheinert |
| 5,864,764 A | 1/1999 | Thro et al. |
| 5,910,946 A | 6/1999 | Csapo |
| 6,047,183 A | 4/2000 | Kingdon et al. |
| 6,128,496 A | 10/2000 | Scheinert |
| 6,292,891 B1 | 9/2001 | Bergenwall et al. |
| 6,370,378 B1 | 4/2002 | Yahagi |
| 6,405,048 B1 | 6/2002 | Haartsen |
| RE37,820 E | 8/2002 | Scheinert |
| 6,459,900 B1 | 10/2002 | Scheinert |
| 6,496,700 B1 | 12/2002 | Chawla et al. |
| 6,603,975 B1 | 8/2003 | Inouchi et al. |
| 6,636,742 B1 | 10/2003 | Torkki et al. |
| 6,711,388 B1 | 3/2004 | Neitiniemi |
| 6,944,426 B1 | 9/2005 | Esser et al. |
| 2002/0075846 A1 | 6/2002 | Valentine et al. |
| 2002/0089951 A1 | 7/2002 | Hyun et al. |
| 2002/0131387 A1 | 9/2002 | Pitcher et al. |
| 2003/0031130 A1 | 2/2003 | Vanghi |

(Continued)

FOREIGN PATENT DOCUMENTS

EP    505106    9/1992

OTHER PUBLICATIONS

International Search Report and Written Opinion for PCT Patent Application No. PCT/US04/25487 mailed Aug. 6, 2004, 10 pgs.

*Primary Examiner* — Sulaiman Nooristany (74) *Attorney, Agent, or Firm* — Blakely, Sokoloff, Taylor & Zafman LLP (57) ABSTRACT

A hierarchical cell structure that may be applicable to any wireless communications network utilizing cells. One or more characteristics associated with a mobile device configured to communicate with the base stations via a wireless communications protocol are determined while the mobile device is communicating with a base station. The one or more characteristics are utilized to determine a subsequent base station to be the target of a handoff procedure.

23 Claims, 5 Drawing Sheets

U.S. PATENT DOCUMENTS

| | | |
|---|---|---|
| 2003/0073455 A1 | 4/2003 | Hashem et al. |
| 2003/0109254 A1 | 6/2003 | Motegi et al. |
| 2003/0115362 A1 | 6/2003 | Tarvainen et al. |
| 2004/0097234 A1* | 5/2004 | Rajkotia et al. ............... 455/442 |
| 2004/0209602 A1 | 10/2004 | Joyce et al. |
| 2005/0282562 A1* | 12/2005 | Lee et al. ...................... 455/458 |
| 2008/0037472 A1* | 2/2008 | Ryu et al. ...................... 370/332 |
| 2008/0039089 A1* | 2/2008 | Berkman et al. .............. 455/436 |

* cited by examiner

HIERARCHICAL CELL DEPLOYMENT

This application claims priority to U.S. Provisional Application No. 60/894,146, entitled, "HIERARCHICAL CELL DEPLOYMENT," filed on Mar. 9, 2007.

TECHNICAL FIELD

Embodiments of the invention relate to cellular communications. More particularly, embodiments of the invention relate to hierarchical cell deployment within a cellular communication system.

BACKGROUND

Cellular radiotelephone communications utilize a network of cells having a base station with one or more antennae that allow the base station to communicate with multiple mobile devices within the cell. These cells typically overlap to provide complete coverage. A mobile device may move from between cells, which results in communication with multiple base stations.

A recent development is the concept of hierarchical cells. A hierarchical cell structure may include, for example, macrocells, microcells and picocells. Macrocells may provide coverage over a relatively large area. One or more microcells may exist within a macrocell and may be used for outdoor coverage, where high capacity is required and larger macrocells cannot cover, such as city streets hidden by large buildings.

One or more picocells may exist within a microcell. Picocells could be deployed for private, indoor services. The picocell locations could be in areas where there is a demand for high data rate services, such as laptop networking or multimedia conferencing. While this hierarchical cell architecture may provide an improvement over other network architectures, the resulting cell structure may not result in optimal performance.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The hierarchical cell structure described herein may be applicable to any wireless communications network utilizing cells. For example, the wireless network may be a Worldwide Interoperability for Microwave Access (WiMAX) network. WiMAX is defined by standards available from the WiMAX Forum, formed in June 2001 to promote conformance and interoperability of the IEEE 802.16 standard, officially known as WirelessMAN. IEEE 802.16 corresponds to IEEE 802.15-2005 entitled "Air Interface for Fixed Broadband Wireless Access Systems" approved Dec. 7, 2005 as well as related documents. Other wireless network protocols may also be supported including, for example, Time Division, Multiple Access (TDMA) protocols, Global System for Mobile Communications (GSM) protocols, Code Division, Multiple Access (CDMA) protocols, and/or any other type of wireless communications protocol.

Figure 1:
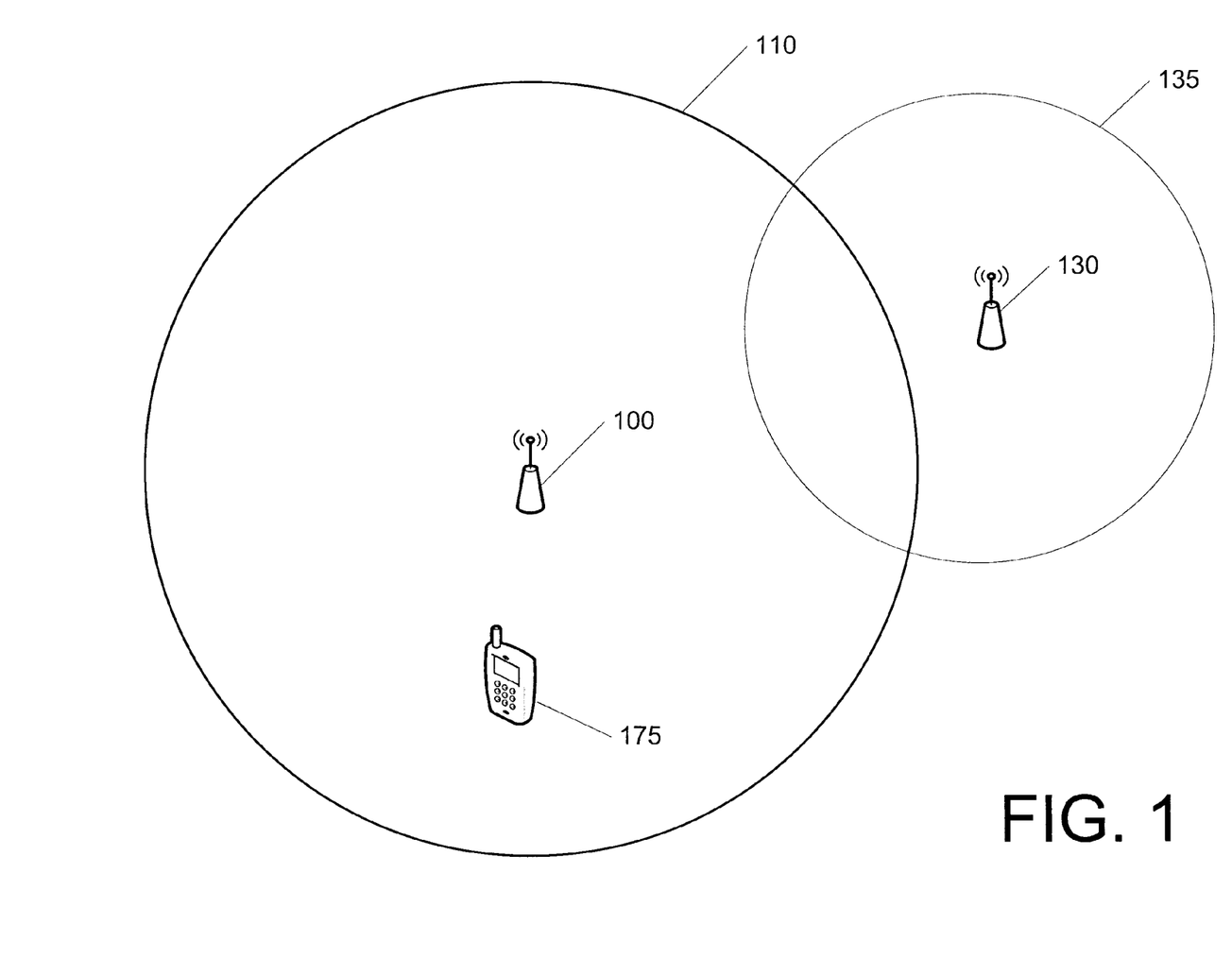
FIG. 1 is a conceptual diagram of one embodiment of a wireless network.

FIG. 1 is a conceptual diagram of one embodiment of a wireless network. The wireless network may support communications utilizing WiMAX and/or any other type of protocol. The wireless network may be used, for example, for cellular voice communications and/or data transfer.

In the examples provided herein, a limited number of levels within a hierarchical cell structure are provided; however, any number of cell levels may be supported. In one embodiment, up to 16 cell types may be supported. In alternate embodiments a different number of cell types may be supported, for example, 8 cell types, 32 cell types, 24 cell types. In general the smaller cells are better for low mobility and high data rate capacities whereas the larger cells are more suitable for high mobility and lower data rates. In order to reduce the handoff frequency and achieve improved data rate, techniques described herein may be utilized to identify cell types prior to handoff.

Handoff procedures typically entail a significant amount of signaling and impose service interrupts and potential packet loss. For example if a user is moving quickly, the mobile device should handoff to a larger cell in order to reduce the handoff frequency and associated handoff signaling and service disruption. In one embodiment, in order to enable an intelligent cell type selection, techniques described herein utilize an identifier of a cell type and size. In one embodiment, a 4-bit TLV identifying the cell type and size may be included in a IEEE 802.16 compliant header, for example, in the MOB-_NBR_ADV or the DL_MAP messages. As another example, the DCD/UCD data structure for a cell can include a cell type parameter. The DCD/UCD data structure contains downlink and uplink channel related information for a cell. Other value sizes, message types, and communications protocols may also be supported.

Base station 100 may provide an access point for wireless communications for one or more mobile wireless devices such as, for example, wireless mobile device 175. Any number of wireless mobile devices may be supported. A wireless mobile device may be, for example, a cellular telephone, a laptop computer, a personal digital assistant, a smart phone, or any other wireless-enabled device. Base station 100 may have a range (e.g., 1 km) corresponding to macrocell 110.

As mobile wireless device 175 moves within cell 110, it may communicate with base station 100. If mobile wireless device 175 exits cell 110, it may be transferred to another base station (not illustrated in FIG. 1). The process of passing wireless mobile device 175 from one base station to another may be referred to as a handover. In general, handovers have an associated overhead that may consume network resources.

In some network configurations a cell (e.g., 110) may include one or more microcells (e.g., 135, 145), each of which may have a corresponding base station (e.g., 130, 140). A microcell may be an area (e.g., 100 m) in which a microcell base station may provide improved coverage for mobile wireless devices to fill coverage holes or provide higher overall capacity. Within a microcell (e.g., 145) there may be provided one or more picocells (e.g., 155, 165). A picocell may have an area (e.g., 10 m) in which a picocell base station (e.g., 150, 160) may fill coverage holes or provide higher overall capacity.

By determining the movement of a mobile wireless device as described herein a base station (or other network component) may reduce the frequency of handovers, provide more efficient handovers, improved signal quality and/or other advantages that may not be available without information related to movement of the mobile wireless device.

Figure 2:
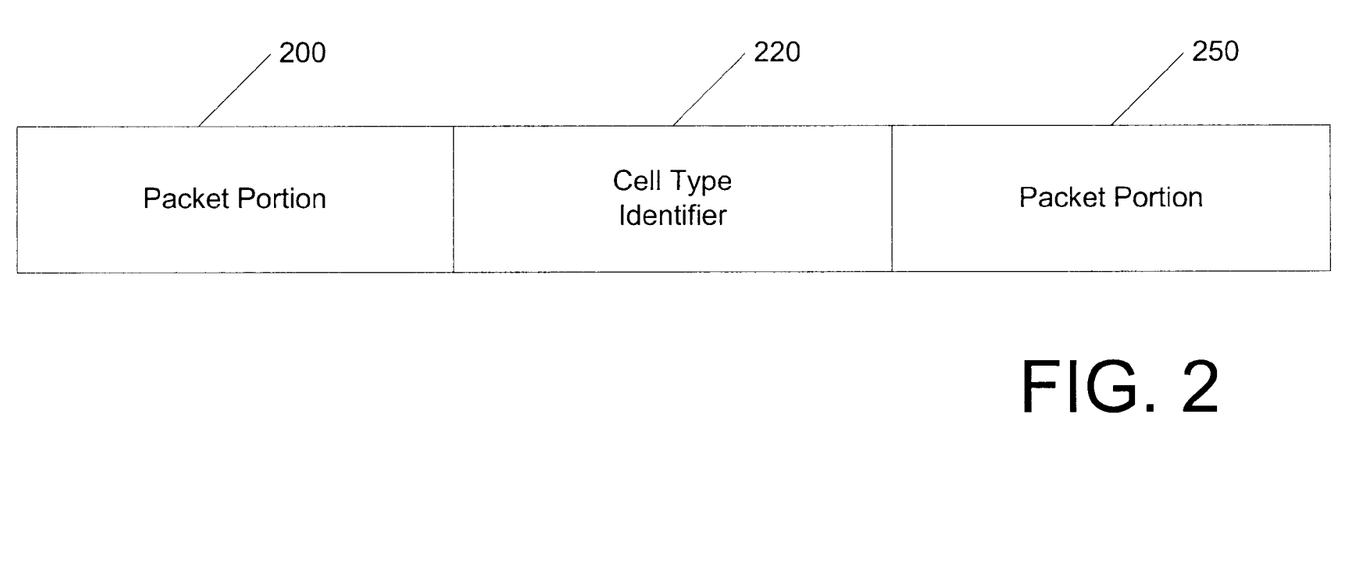
FIG. 2 illustrates one embodiment of a field that may indicate cell type.

FIG. 2 illustrates one embodiment of a field that may indicate cell type. As discussed above, using WiMAX as an example, the MOB_NBR_ADV or the DL_MAP messages may include WiMAX standard defined portions 220 and 250 as well as cell type identifier field 220. In one embodiment, the cell type identifier is a 4-bit value that indicated a type of cell. For example, 0000 may refer to a smallest cell type (e.g., a picocell), 0001 may refer to a next larger cell (e.g., a microcell) and so on. In alternate embodiments, other cell type identifier sizes and/or other field types may be utilized.

The cell type information may be utilized for network-initiated and/or for mobile device-initiated handoffs. For example, the mobile device and/or the network may determine the frequency of handoffs and utilize that information to determine whether the mobile device should be moved to a larger (in the case of a high handoff frequency) or a smaller (in the case of a low handoff frequency) cell. In one embodiment, one or more of the following characteristics may be used to determine a cell type to transfer to: a handoff frequency, a travel speed, a direction of travel, a bandwidth usage, a current cell type. Additional and/or different characteristics may also be supported.

Figure 3:
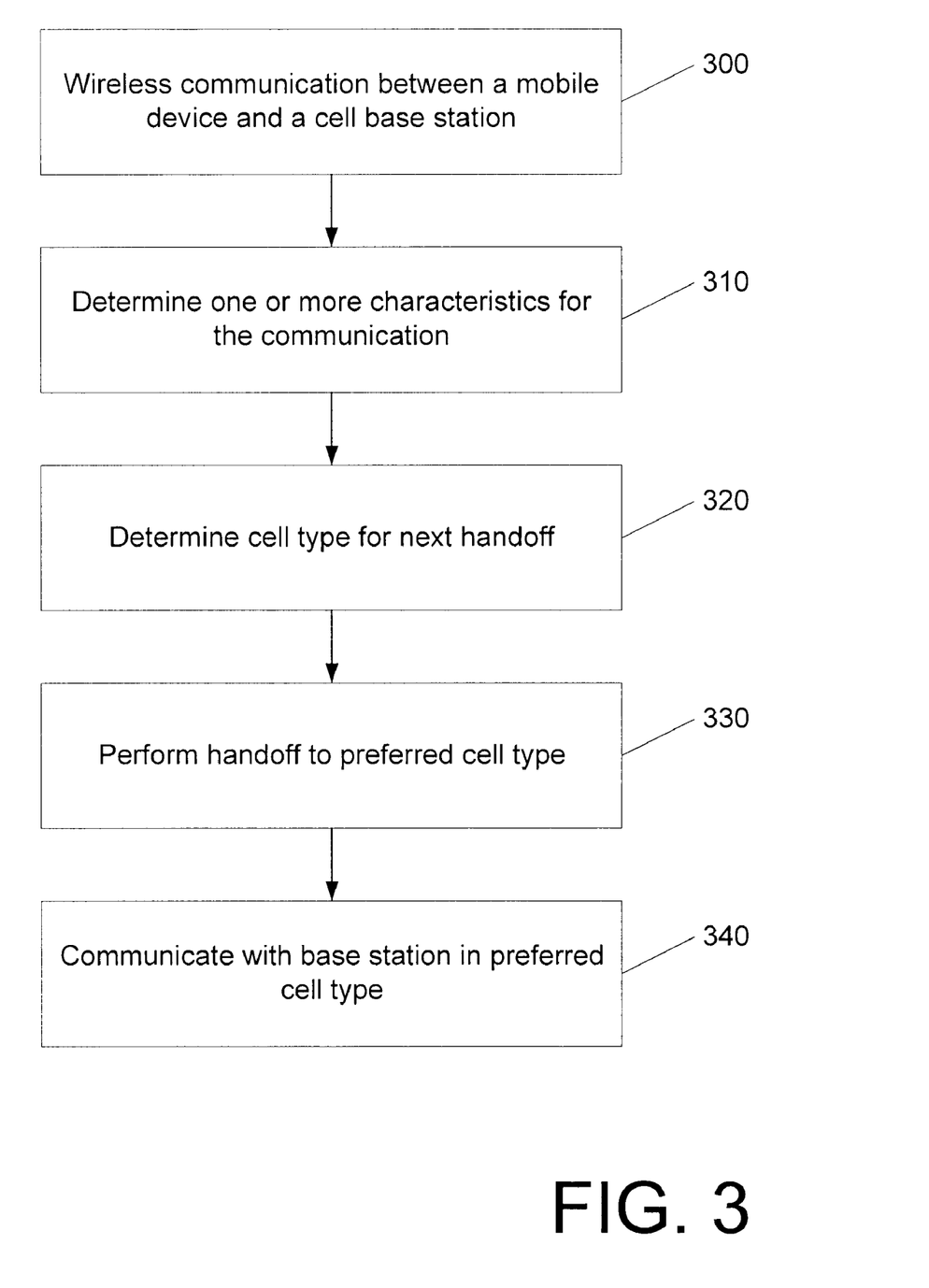
FIG. 3 is a flow diagram of one embodiment of a technique for a handoff utilizing cell type information.

FIG. 3 is a flow diagram of one embodiment of a technique for a handoff utilizing cell type information. The techniques described herein, including the example of FIG. 3, may be performed by a mobile wireless device, a base station or some combination thereof. The process may allow the mobile device and/or the base station to determine the cell type to which the mobile device should be transferred during a subsequent handoff.

A mobile wireless electronic device may communicate with a base station utilizing any appropriate wireless protocol, 300. The base station may be at any level in the hierarchical cell architecture as described herein.

During the time that the mobile wireless electronic device communicates with the first base station, one or more characteristics corresponding to the communication may be determined, 310. These characteristics may include, for example, handoff frequency for the mobile device, a travel speed of the mobile device, a direction of travel for the mobile device, a bandwidth usage, a current cell type. These characteristics may be determined by the mobile device, the base station and/or any other network entity.

Utilizing the characteristics corresponding to the communication, the preferred next cell type may be determined, 320. The next cell type may be determined by the mobile device, the base station and/or any other network entity. For example, if the mobile device has experienced a handoff frequency above a specified threshold, a larger cell type may be preferred. As another example, if the mobile device has experienced dropped data and/or lower than requested throughput, a smaller cell type may be preferred.

When the next handoff occurs, the mobile device may transition to a cell of the preferred cell type, 330. The handoff may occur as a result of the mobile device reaching a cell boundary or the handoff may occur as a result of determining that a different cell type is preferred. For example, the mobile device may be within a picocell and a macrocell. As the bandwidth usage of the mobile device increases, the mobile device may transition to the picocell that can provide increased data rates.

In one embodiment, messages used in association with a handoff allow the mobile device, base stations and/or other network devices to determine the type of cell currently used by the mobile device as well as the type of cell to which the mobile device may transition. After the transition the mobile device may communicate with a second base station that corresponds to the preferred cell type, 340.

Figure 4:
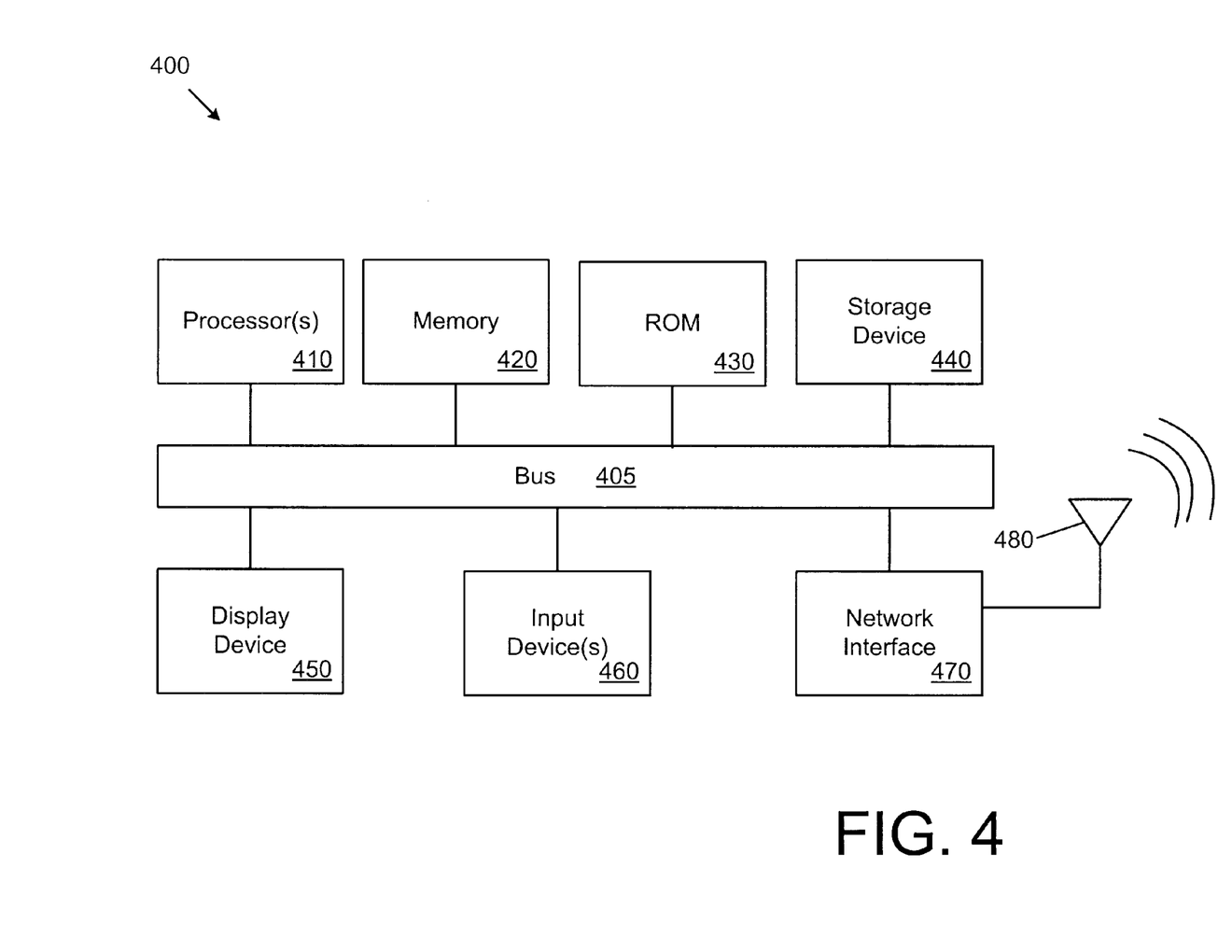
FIG. 4 is a block diagram of one embodiment of a mobile electronic device.

FIG. 4 is a block diagram of one embodiment of a mobile electronic device. Alternative electronic devices can include more, fewer and/or different components. In one embodiment, the electronic device of FIG. 4 is a mobile device that may function as the mobile device of FIG. 1. In one embodiment, the mobile device is a smartphone or other cellular-enabled device.

Electronic system 400 includes bus 405 or other communication device to communicate information, and processor 410 coupled to bus 405 to process information. While electronic device 400 is illustrated with a single processor, electronic device 400 can include multiple processors and/or co-processors. Electronic device 400 further includes random access memory (RAM) or other dynamic storage device 420 (referred to as memory), coupled to bus 405 to store information and instructions to be executed by processor 410. Memory 420 also can be used to store temporary variables or other intermediate information during execution of instructions by processor 410.

Electronic device 400 also includes read only memory (ROM) and/or other static storage device 430 coupled to bus 405 to store static information and instructions for processor 410. Data storage device 440 is coupled to bus 405 to store information and instructions. Data storage device 440 such as a magnetic disk or optical disc and corresponding drive can be coupled to electronic device 400.

Electronic device 400 can also be coupled via bus 405 to display device 450, such as liquid crystal display (LCD) or other display device, to display information to a user. Input device(s) 460 may include any type of user input device and may be coupled to bus 405 to communicate information and command selections to processor 410. Electronic device 400 further includes network interface 470 to provide access to a network, such as a local area network. Network interface 470 may include one or more antennae 480 to communicate utilizing wireless protocols.

Figure 5:
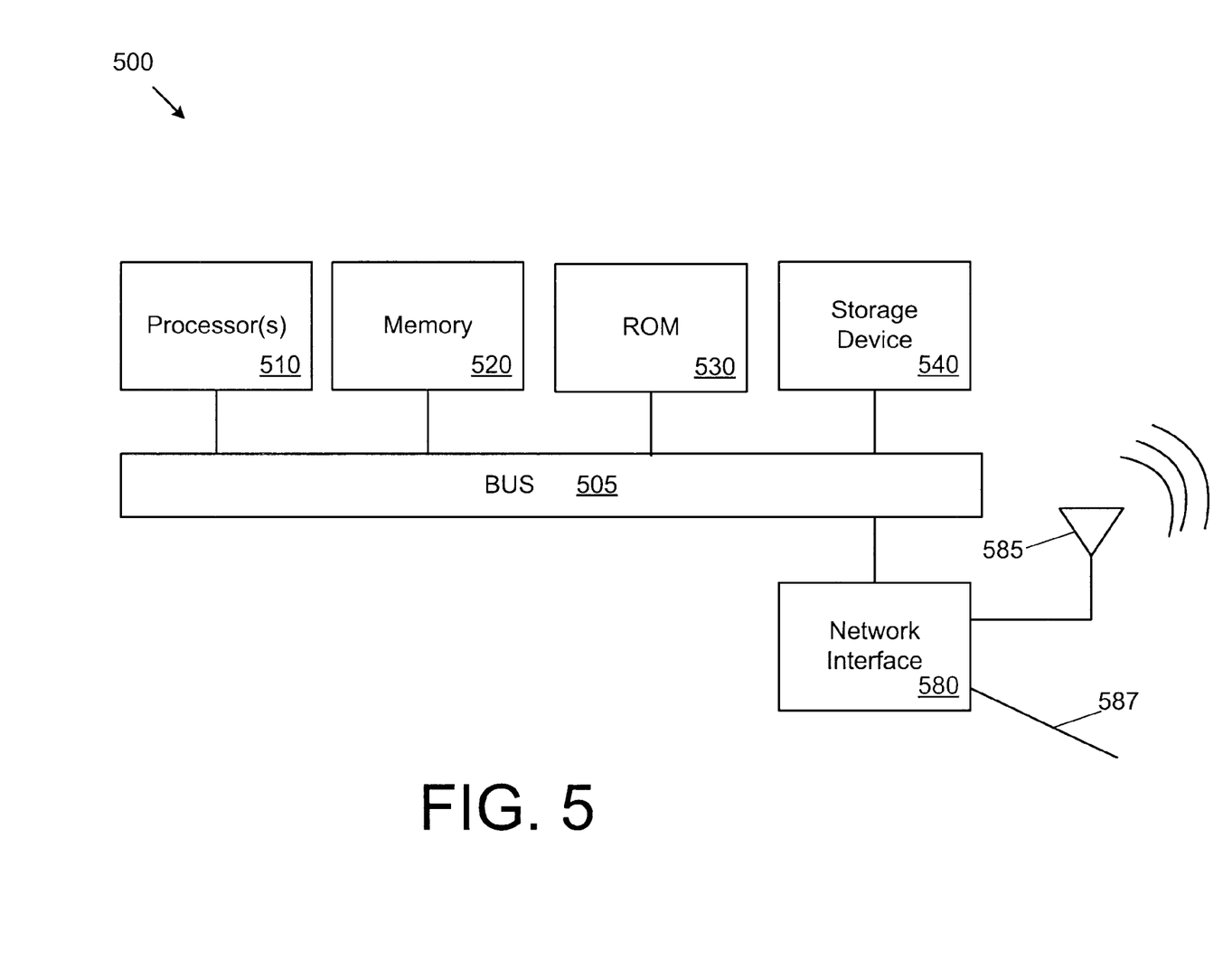
FIG. 5 is a block diagram of one embodiment of a base station.

FIG. 5 is a block diagram of one embodiment of a base station. The base station illustrated in FIG. 5 is intended to represent a range of base stations (e.g., for a macrocell, for a picocell). Alternative base stations may include more, fewer and/or different components.

Base station 500 may include bus 505 or other communication device to communicate information, and processor 510 coupled to bus 505 that may process information. While base station 500 is illustrated with a single processor, base station 500 may include multiple processors and/or co-processors. Base station 500 further may include random access memory (RAM) or other dynamic storage device 520, coupled to bus 505 and may store information and instructions that may be executed by processor 510. For example, the process of FIG. 3 may be implemented as instructions stored in memory 520 that are executed by processor 510. Memory 520 may also be used to store temporary variables or other intermediate information during execution of instructions by processor 510.

Base station 500 may also include read only memory (ROM) and/or other static storage device 530 coupled to bus 505 that may store static information and instructions for processor 510. Data storage device 540 may be coupled to bus 505 to store information and instructions. Data storage device 540 such as a magnetic disk or optical disc and corresponding drive may be coupled to base station 500.

Base station 500 further may include network interface(s) 580 to provide access to a network. Network interface(s) 580 may include, for example, a wireless network interface having antenna 585, which may represent one or more antenna(e) that may communicate utilizing any of the protocols described herein. Network interface(s) 580 may also include, for example, a wired network interface to communicate with remote devices via network cable 587, which may be, for example, an Ethernet cable, a coaxial cable, a fiber optic cable, a serial cable, or a parallel cable.

A computer-readable medium includes any mechanism that provides (e.g., memory 520, ROM 530, storage device 540) content (e.g., computer executable instructions) in a form readable by an electronic device (e.g., a computer, a personal digital assistant, a cellular telephone). For example, a computer-readable medium includes read only memory (ROM); random access memory (RAM); magnetic disk storage media; optical storage media; flash memory devices, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   determining one or more cells of a plurality of hierarchical cells based on one or more characteristics associated with a mobile device configured to communicate with a plurality of base stations associated with the plurality of cells via a wireless communications protocol while the mobile device functions within a first cell of a first cell type, wherein at least one of the one or more characteristics is communicated to a first base station, associated with the first cell, via a field of a packet conforming to the wireless communications protocol wherein the one or more characteristics comprise at least one of a handoff frequency, a travel speed, a direction of travel, a bandwidth usage, and a current cell type;
   utilizing the one or more characteristics to identify a second cell of a second cell type to be the target of a handoff procedure prior to performing the handoff procedure, wherein the second cell type is identified prior to the handoff procedure, wherein the one or more characteristics are communicated to a second base station associated with the second cell, wherein the target includes a larger cell in case of a high handoff frequency such that the mobile device is moved to the larger cell, and a smaller cell in case of a low handoff frequency such that the mobile device is moved to the smaller cell; and
   transferring the mobile device from the first cell of the first cell type to function within the second cell of the second cell type;
   wherein the second base station is selected from a cell type based on the one or more characteristics;
   wherein the cell type is communicated as a 4-bit value within a WiMAX compliant message between the second base station and the mobile device; and
   wherein the WiMAX compliant message comprises a DL_MAP message.

2. The method of claim 1 wherein the mobile device comprises a cellular-enabled communications device.

3. The method of claim 1 wherein the mobile device comprises a laptop computer system.

4. The method of claim 1 wherein the wireless communications protocol comprises a WiMAX compliant protocol.

5. The method of claim 1 wherein the wireless communications protocol comprises a TDMA protocol.

6. The method of claim 1 wherein the wireless communications protocol comprises a CDMA protocol.

7. The method of claim 1 wherein the multiple cells with corresponding base stations comprise at least a macrocell having a corresponding base station, wherein one or more microcells with respective base stations exist within the macrocell.

8. The method of claim 7 wherein the coverage area and/or the data rate provided by the macrocell base station is different than the coverage area and/or the data rate of the microcell base stations.

9. The method of claim 7, wherein one or more picocells with respective base stations exist within the microcell.

10. The method of claim 9 wherein the coverage area and/or the data rate provided by the microcell base station is different than the coverage area and/or the data rate of the picocell base stations.

11. The method of claim 1 wherein the WiMAX compliant message comprises a MOB_NBR_ADV message.

12. A network comprising:
    a plurality of base stations to provide wireless communications within a plurality of cells, the cells configured in a hierarchical architecture;
    at least one mobile wireless device to communicate with one or more of the plurality of base stations via a wireless communications protocol;
    the plurality of base stations or the mobile wireless device to determine one or more cells of the plurality of cells based on one or more characteristics associated with the mobile wireless device while the mobile wireless device functions within a first cell of a first cell type associated with a first base station in the plurality of base stations and to utilize the one or more characteristics to identify a second cell of a second cell type to be the target of a handoff procedure prior to performing the handoff procedure such that after the handoff the mobile wireless device communicates with a second base station associated with the second cell wherein the one or more characteristics comprise at least one of:
    a handoff frequency, a travel speed, a direction of travel, a bandwidth usage, a current cell type, wherein the second cell type is identified prior to the handoff procedure, wherein the one or more characteristics are communicated to the second base station associated with the second cell;
    transferring the mobile wireless device from the first cell of the first cell type to function within the second cell of the second cell type, wherein the target includes a larger cell in case of a high handoff frequency such that the mobile device is moved to the larger cell, and a smaller cell in case of a low handoff frequency such that the mobile device is moved to the smaller cell;
    wherein the second base station is selected from a cell type based on the one or more characteristics;

wherein the cell type is communicated as a 4- bit value within a WiMAX compliant message between the second base station and the mobile device; and wherein the WiMAX compliant message comprises a DL_MAP message.

13. The network of claim 12 wherein the wireless communications protocol comprises a WiMAX compliant protocol.

14. The network of claim 12 wherein the wireless communications protocol comprises a TDMA protocol.

15. The network of claim 12 wherein the wireless communications protocol comprises a CDMA protocol.

16. The network of claim 12 wherein the plurality of base stations provide multiple cells corresponding to the base stations that comprise at least a macrocell having a corresponding base station, wherein each macro cell includes one or more microcells with respective base stations.

17. The network of claim 16 wherein the coverage area and/or the data rate provided by the macrocell base station is different than the coverage area and/or the data rate of the microcell base stations.

18. The network of claim 16, wherein one or more picocells with respective base stations exist within the microcell.

19. The network of claim 18 wherein the coverage area and/or the data rate provided by the microcell base station is different than the coverage area and/or the data rate of the picocell base stations.

20. The network of claim 12 wherein the WiMAX compliant message comprises a MOB_NBR_ADV message.

21. At least one non-transitory machine-readable storage medium comprising a plurality of instructions that in response to being executed on a computing device, causes the computing device to carry out a method according to one or more operations comprising:

determining one or more cells of a plurality of hierarchical cells based on one or more characteristics associated with a mobile device configured to communicate with a plurality of base stations associated with the plurality of cells via a wireless communications protocol while the mobile device functions within a first cell of a first cell type, wherein at least one of the one or more characteristics is communicated to a first base station, associated with the first cell, via a field of a packet conforming to the wireless communications protocol wherein the one or more characteristics comprise at least one of a handoff frequency, a travel speed, a direction of travel, a bandwidth usage, and a current cell type;

utilizing the one or more characteristics to identify a second cell of a second cell type to be the target of a handoff procedure prior to performing the handoff procedure, wherein the second cell type is identified prior to the handoff procedure, wherein the one or more characteristics are communicated to a second base station associated with the second cell, wherein the target includes a larger cell in case of a high handoff frequency such that the mobile device is moved to the larger cell, and a smaller cell in case of a low handoff frequency such that the mobile device is moved to the smaller cell;

transferring the mobile device from the first cell of the first cell type to function within the second cell of the second cell type;

wherein the second base station is selected from a cell type based on the one or more characteristics;

wherein the cell type is communicated as a 4- bit value within a WiMAX compliant message between the second base station and the mobile device; and wherein the WiMAX compliant message comprises a DL_MAP message.

22. The non-transitory machine-readable storage medium of claim 21 wherein the mobile device comprises a cellular-enabled communications device.

23. The non-transitory machine-readable storage medium of claim 21 wherein the mobile device comprises a laptop computer system.

* * * * *